PRIEST & HOWARD.
Spring Scale.
No. 94,974. Patented Sept. 21, 1869.
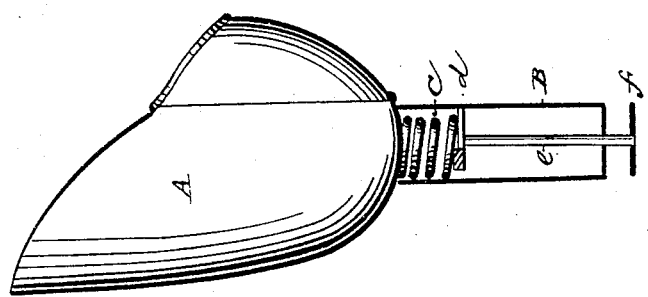
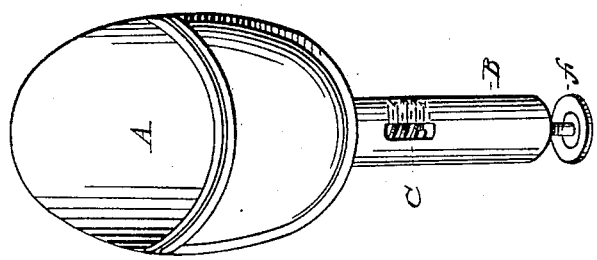
Witnesses
Geo Moffette
J. L. Newton
Inventors:
Daniel H. Priest
John C. Howard

United States Patent Office.

DAVID H. PRIEST, OF WATERTOWN, AND JOHN R. HOWARD, OF CHARLESTOWN, MASSACHUSETTS.

Letters Patent No. 94,974, dated September 21, 1869.

IMPROVEMENT IN WEIGHING-SCOOPS.

The Schedule referred to in these Letters Patent and making part of the same.

*To all whom it may concern:*

Be it known that we, DAVID H. PRIEST, of Watertown, and JOHN R. HOWARD, of Charlestown, in the county of Middlesex, and State of Massachusetts, have invented a new and useful Scoop; and we hereby declare that the following is a full and exact description of the same, and we refer to the accompanying drawings, and to the letters thereon marked, as parts of the specification, of which—

Figure 1 is a perspective view of the scoop, and
Figure 2 is a section of the same.

The letter A represents the bowl of the scoop;
B, the handle;
c, the spring of the scales;
d, the index;
e, the bar or standard; and
f, the platform attached thereto.

The nature of the invention consists in constructing a scoop or measure for flour, sugar, &c., with a handle, in which, and attached to, are scales, for weighing the contents of the scoop or measure; and the invention is in the arrangement, construction, and application of the scales to the handle, for the purpose of weighing, which is thus described:

The scoop or measure is made of tin or any suitable material, and is constructed in the usual form.

In the handle, which is hollow, is fastened, at its upper end, and joining the bowl of the scoop, a spiral or suitable spring, as seen in fig. 2, in the drawings, having an index, $d$, which passes through a slot in the handle, and indicates the weight upon the scale, graduated on the handle, as seen in fig. 1, in the drawings.

Upon the lower end of the spring $c$ is attached the bar or standard $e$, passing through the end of the handle, having a platform, $f$. The spring is graduated as in the balance-scales, and is used, of course, for weighing light articles.

In order to weigh the contents of the scoop, fill it with flour or other substance, and stand it upon the platform $f$, and the weight will be indicated by the index upon the graduated scale.

The platform $f$ may be of any convenient size, and the lower end of the handle may be opened or partially closed.

The novelty and usefulness of the invention are most readily seen.

The expense, in addition to the ordinary scoop, is but trifling, and its use, in weighing flour, sugar, eggs, &c., where weight must be regarded in cooking, will become indispensable to the cook.

What we claim as our invention, and desire to secure by Letters Patent, is—

The combination and arrangement of the handle B, the spring $c$, the rod $e$, and the platform $f$, with the scoop A, said handle B being rigidly fastened to the scoop, and the whole being constructed substantially as and for the purpose set forth.

DAVID H. PRIEST.
JOHN R. HOWARD.

Witnesses:
GEO. MOFFETTE,
J. L. NEWTON.